(12) United States Patent
Lee et al.

(10) Patent No.: US 8,269,741 B2
(45) Date of Patent: Sep. 18, 2012

(54) TOUCH SCREEN PANEL DEVICE

(75) Inventors: Choon-Hyop Lee, Suwon-si (KR);
Jung-Mok Park, Suwon-si (KR);
Sung-Ku Kang, Suwon-si (KR);
Hwan-Hee Jeong, Suwon-si (KR);
Tae-Hyeog Jung, Suwon-si (KR);
Shawn Kim, Suwon-si (KR);
Sang-Kook Kim, Suwon-si (KR)

(73) Assignee: Samsung Mobile Display Co., Ltd. (KR)

( * ) Notice: Subject to any disclaimer, the term of this patent is extended or adjusted under 35 U.S.C. 154(b) by 278 days.

(21) Appl. No.: 12/652,531

(22) Filed: Jan. 5, 2010

(65) Prior Publication Data
US 2010/0182281 A1   Jul. 22, 2010

(30) Foreign Application Priority Data
Jan. 16, 2009   (KR) ..................... 10-2009-0003640

(51) Int. Cl.
*G06F 3/042* (2006.01)
(52) U.S. Cl. .................. 345/173; 178/18.08; 428/354
(58) Field of Classification Search ......... 345/173–176; 178/18.01–18.06, 18.08; 428/354
See application file for complete search history.

(56) References Cited

U.S. PATENT DOCUMENTS

| | | | |
|---|---|---|---|
| 2003/0232192 A1* | 12/2003 | Kishioka et al. | 428/354 |
| 2010/0039578 A1* | 2/2010 | Roh et al. | 349/58 |
| 2010/0066700 A1* | 3/2010 | Mozdzyn | 345/174 |

FOREIGN PATENT DOCUMENTS

| | | |
|---|---|---|
| JP | 10-225989 | 8/1998 |
| KR | 10-2004-0027906 A | 4/2004 |
| KR | 10-2004-0070023 A | 8/2004 |
| KR | 10-2004-0111052 A | 12/2004 |
| KR | 10-2005-0014890 | 12/2004 |

* cited by examiner

*Primary Examiner* — Kevin M Nguyen
*Assistant Examiner* — Sepideh Ghafari
(74) *Attorney, Agent, or Firm* — Knobbe Martens Olson & Bear LLP (57) ABSTRACT

The touch screen panel device according to the embodiment of the present embodiments includes: a touch screen panel; and an adhesive member that is formed on at least any one of an upper surface and a lower surface of the touch screen panel and includes an adhesive layer and re-releasing coating layers formed on both surfaces of the adhesive layer, wherein the re-releasing coating layer is formed by adding fluorine (F) or silicon (Si) into UV curing resin.

20 Claims, 4 Drawing Sheets

TOUCH SCREEN PANEL DEVICE

CROSS-REFERENCE TO RELATED APPLICATIONS

This application claims priority to and the benefit of Korean Patent Application No. 10-2009-0003640, filed on Jan. 16, 2009, in the Korean Intellectual Property Office, the entire content of which is incorporated herein by reference.

BACKGROUND OF THE INVENTION

1. Field of the Invention

The present embodiments relate to a touch screen panel device, and more particularly, to a touch screen panel device that has an adhesive member re-releasably formed on one surface of the touch screen.

2. Description of the Related Art

A touch screen panel is an input device that a user can input his or her instruction by selecting an instructed content displayed on a flat panel display device such as a liquid crystal display device, etc. using a finger or an object.

To this end, the touch screen panel is provided on the front face of the image display device to convert a contact position to which the finger or object is directly contacted into an electrical signal. Therefore, the instructed content selected on the contact position is accepted as an input signal. However, a window is generally attached to the front face of the touch screen panel where the contact is performed in order to improve stiffness and protect the panel.

The touch screen panel as described above can replace an input device, e.g., a keyboard, a mouse, or the like to be coupled to the image display device to operate so that its applications are expanded widely.

At this time, when attaching a window and a flat panel display device to the front face and rear face of the touch screen panel, respectively, an optically clear adhesive (OCA) film is generally used.

However, this method may lead to a defect due to air bubbles and inflow of foreign substance, etc. between each layer during the adhering process of the OCA film. Therefore, there is a difficulty in view of securing mass-productivity and thus, a repair work is independently required in view of securing yields.

Meanwhile, in the case where such an OCA film is used as an adhesive member, when the touch screen panel is erroneously adhered to the window and the flat panel display device due to a laminating defect, etc., the releasing cannot be performed due to the strong adhesive force, having a disadvantage that the repair work cannot be performed. The present embodiments overcome the above problems and provide additional advantages as well.

SUMMARY OF THE INVENTION

Some embodiments relate to a touch screen panel device that implements an adhesive member formed on one surface of the touch screen panel as being re-releasable by performing a surface treatment on the adhesive member so that when a window and a flat panel display device positioned on the front face and rear face of the touch screen panel are erroneously attached, repair work can be performed by detaching them.

According to one aspect of the present embodiments, there is provided a touch screen panel device including: a touch screen panel; and an adhesive member that is formed on at least any one of an upper surface and a lower surface of the touch screen panel and includes an adhesive layer and re-releasing coating layers formed on both surfaces of the adhesive layer, wherein the re-releasing coating layer is formed by adding fluorine (F) or silicon (Si) into UV curing resin.

The touch screen panel device further includes a window that is attached to the upper surface of the touch screen panel by the adhesive member formed on the upper surface of the touch screen panel; and a flat panel display device that is attached to the lower surface of the touch screen panel by the adhesive member formed on the lower surface of the touch screen panel.

Also, the adhesive layer is implemented using a transparent adhesive material having a high light transmittance and comprises a super view resin (SVR) or optical cleared adhesive (OCA) film. The fluorine or silicon additives included in the re-releasing coating layer are phase-separated through a pre-cure process to be positioned on the surface.

In some embodiments, the touch screen panel includes a transparent substrate; a plurality of first sensing patterns (X patterns) formed on the transparent substrate and formed to be coupled to each other along a first direction; a first insulating film formed on the first sensing patterns; and a plurality of second sensing patterns (Y patterns) formed on the first insulating film and formed to be coupled to each other along a second direction and disposed alternately with the first sensing patterns not to overlap with the first sensing patterns.

With the present embodiments as described herein, the adhesive member formed on one surface of the touch screen panel is implemented as being re-releasable by performing a surface treatment on the adhesive member. Thereby, when the window and the flat panel display device positioned on the front face and rear face of the touch screen panel are erroneously attached, repair work can be performed by detaching them, thereby having the advantage that yields are improved.

BRIEF DESCRIPTION OF THE DRAWINGS

The accompanying drawings, together with the specification, illustrate exemplary embodiments, and, together with the description, serve to explain the principles of the present embodiments.

DETAILED DESCRIPTION OF THE INVENTION

In the following detailed description, only certain exemplary embodiments have been shown and described, simply by way of illustration. As those skilled in the art would realize, the described embodiments may be modified in various different ways, all without departing from the spirit or scope of the present embodiments. Accordingly, the drawings and description are to be regarded as illustrative in nature and not restrictive. In addition, when an element is referred to as being "on" another element, it can be directly on the element or it can be indirectly on the element with one or more intervening elements interposed therebetween. Also, when an element is referred to as being "connected to" another element, it can be directly connected to the element or it can be indirectly connected to the element with one or more intervening elements interposed therebetween. Hereinafter, like reference numerals refer to like elements.

Hereinafter, exemplary embodiments according to the present embodiments will be described in more detail with reference to the accompanying drawings.

Figure 1:
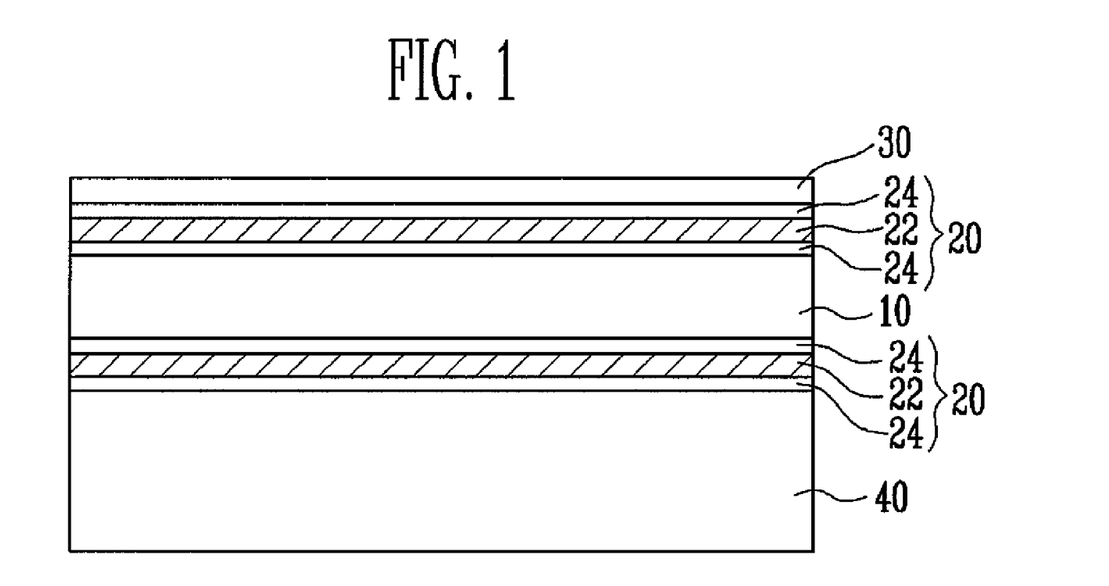
FIG. 1 is a combined cross-sectional view of a touch screen panel device according to an embodiment.

FIG. 1 is a combined cross-sectional view of a touch screen panel device according to an embodiment.

Referring to FIG. 1, the touch screen panel device according to the embodiment is characterized in that an adhesive member 20 is formed on at least one surface of an upper surface and a lower surface of a touch screen panel 10, and a window 30 is attached to the upper surface of the touch screen panel 10 or a flat panel display device 40 is attached to the lower surface of the touch screen panel 10, by the adhesive member 20.

Here, the adhesive member 20 includes an adhesive layer 22 and re-releasing coating layers formed on both surfaces of the adhesive layer. The re-releasing coating layer 24 serves to decrease surface energy on the surface of the adhesive layer 22 and to increase a contact angle thereon, thereby making it possible to perform repair work when the window 30 and the flat panel display device 40 are erroneously attached to the touch screen panel 10.

In some embodiments, the adhesive layer 22 is implemented using a transparent adhesive material having a high light transmittance, and, for example, it may comprise supper view resin (SVR) or optical cleared adhesive (OCA) film, etc.

Also, the re-releasing coating layer 24, which is formed on the surface of the adhesive layer 22, is formed on one surface of the adhesive layer 22 by adding fluorine (F) or silicon (Si) into UV curing resin.

The fluorine or silicon additives included in the re-releasing coating layer 24 are phase-separated through a pre-cure process to be floated on the surface, and the substances lower the surface energy of the adhesive layer 22, thereby weakening the surface adhesion force of the adhesive layer 22.

Here, the lowering of the surface energy of the adhesive layer 22 is obtained as the contact angle on the surface of the adhesive layer 22 is increased.

Figure 2A:
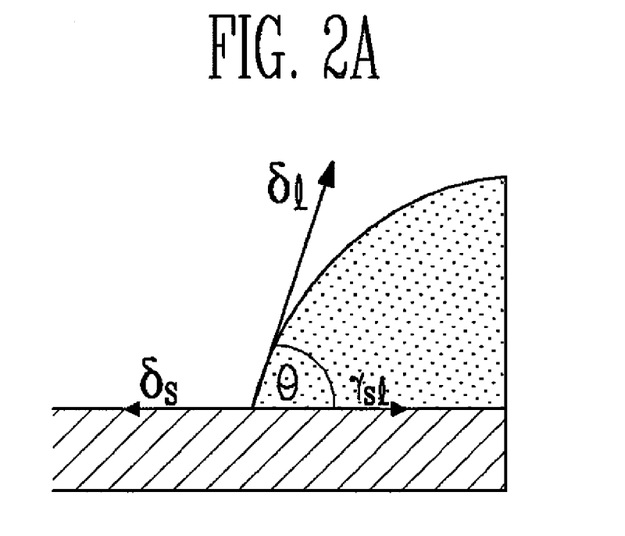
FIGS. 2A to 2C show a contact angle, and a contact angle increased by a re-releasing coating layer of FIG. 1.
Figure 2B:
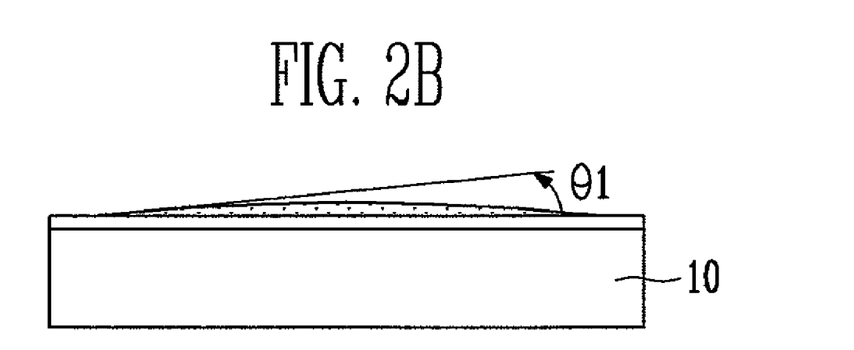
Figure 2C:
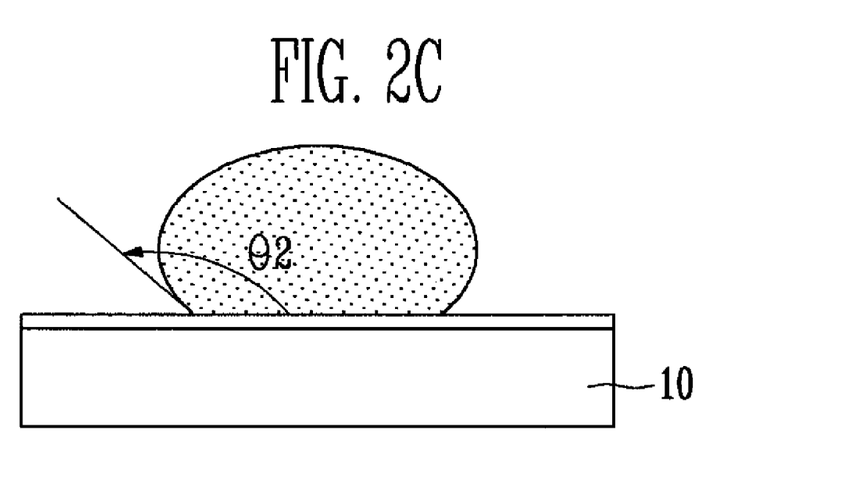

FIGS. 2A to 2C show a contact angle, and a contact angle increased by a re-releasing coating layer of FIG. 1.

In a waterdrop formed on a surface of a solid (substrate), the contact angle refers to an angle (Θ) made by a contact line of a solid surface and a waterdrop surface meet on a point where three phases meet, as shown in FIG. 2A.

FIG. 2B shows a contact angle (Θ1) of a general adhesive layer of the related art, and FIG. 2C shows an adhesive member according to the present embodiments, that is, a contact angle (Θ2) in a state where the re-releasing coating layer is formed on the surface of the adhesive layer.

With the embodiment as shown, it can be appreciated that the contact angle is significantly increased compared to the general adhesive layer of the related art. Such a contact angle can be controlled according to the concentration of additive or the degree of pre-cure when forming the re-releasing coating layer.

In this embodiment, the surface energy of the adhesive layer remains at lowest when the contact angle remains at degree of from about 113° to 118°.

Also, the re-releasing coating layer is formed on one surface of the adhesive layer through the coating process. The coating process may be implemented using general coating methods such as a deposition method, a brushing method, a dipping method, a spin coating method, a slit coating method, and a UV curable flow coating method, etc.

Figure 3:
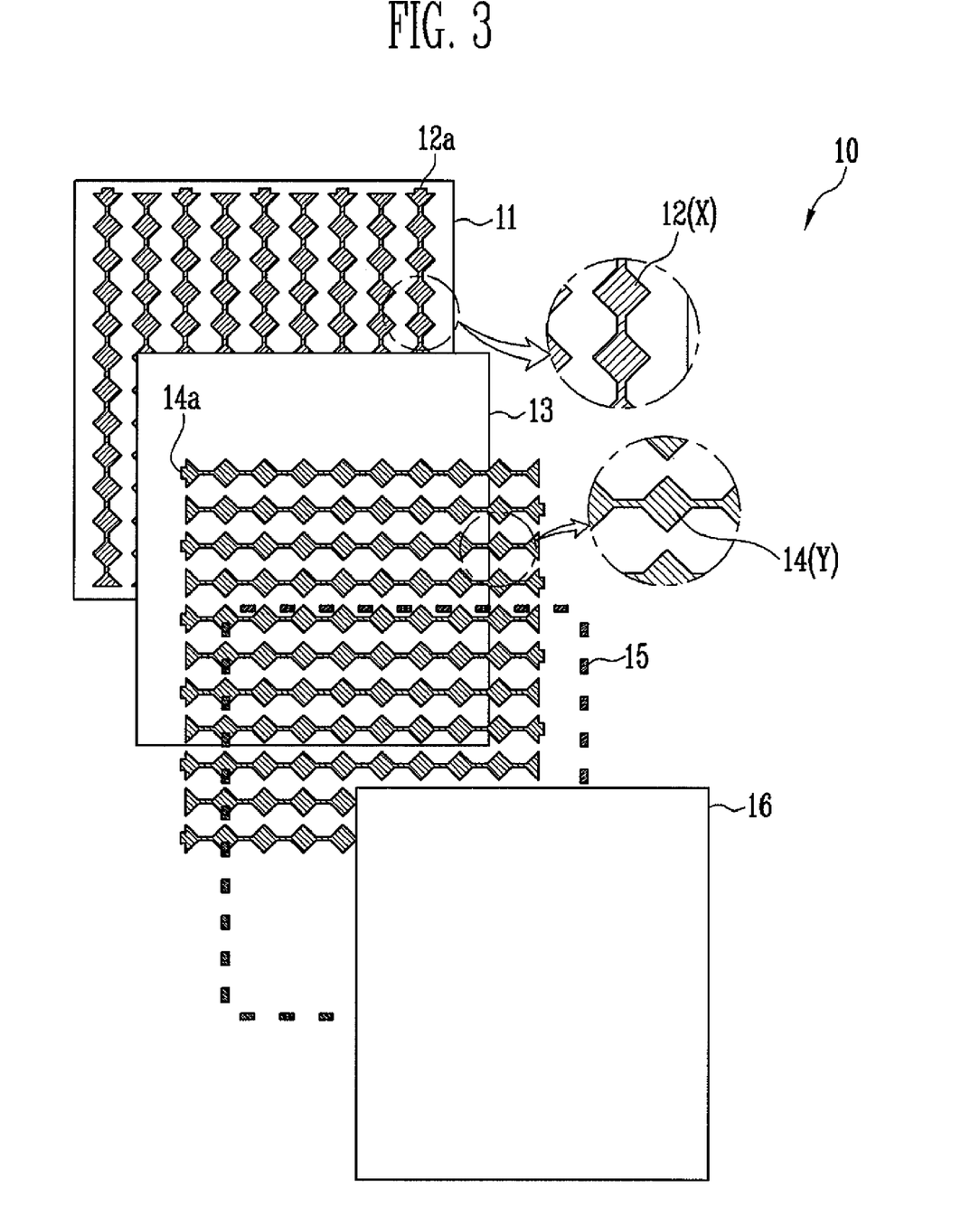
FIG. 3 is an exploded plan view of a touch screen panel of FIG. 1.
Figure 4:
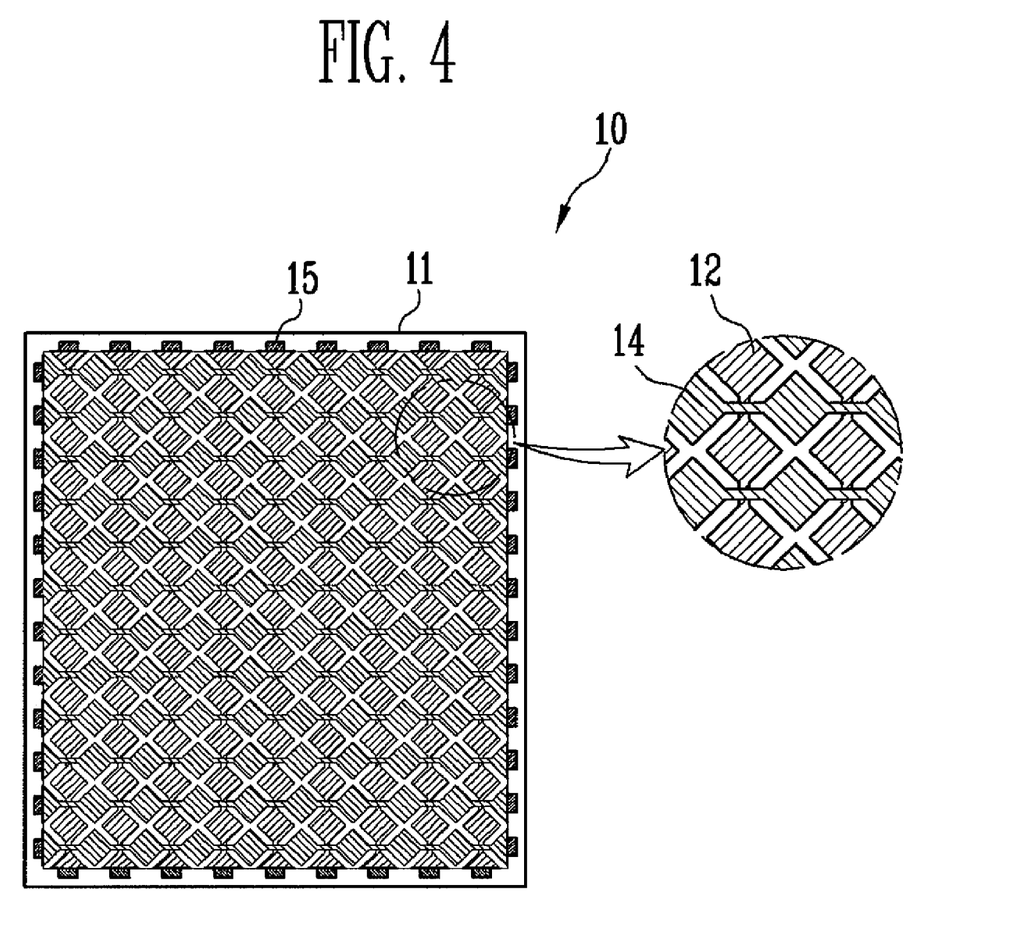
FIG. 4 is a combined plan view of the touch screen panels of FIG. 3.

FIG. 3 is an exploded plan view of a touch screen panel of FIG. 1, and FIG. 4 is a combined plan view of the touch screen panels of FIG. 3.

Referring to FIGS. 3 and 4, the touch screen panel 10 according to this embodiment includes a transparent substrate 11, and first sensing patterns 12, a first insulating film 13, second sensing patterns 14, metal patterns 15 and a second insulating film 16 that are formed sequentially on the transparent substrate 11.

The first sensing patterns 12 are formed on one surface of the transparent substrate 11 to be coupled to each other along a first direction. For example, the first sensing patterns 12 may be formed on the upper surface of the transparent substrate 10 to be close to each other, having a regular pattern such as a diamond pattern. The first sensing patterns 12 as described above may include a plurality of X patterns, wherein first sensing patterns 12 having the same X-coordinates in one row are coupled to each other. Here, the shape of the first sensing patterns 12 is not limited to the diamond shape, but it may be implemented as various shapes that the sensing patterns can be closed to each other.

In some embodiments, the first sensing patterns 12 have pads 12a so that they can be electrically coupled to the metal patterns 15 in the row unit. The pads 12a of the first sensing patterns 12 may be alternately provided on the upper side or the lower side, may be positioned on only the upper side or the lower side, or may be positioned on both the upper and lower sides, in the row unit.

However, in some embodiments, the first sensing patterns 12 are formed not to overlap with the second sensing patterns 14, except for the coupling portions thereof. The first sensing patterns 12 and the second sensing patterns 14 are disposed alternately to cross each other.

The first insulating film 13 is formed on the first sensing patterns 12 to cover them.

The second sensing patterns 14 are formed on the first insulating layer 13 to be coupled to each other along a second direction, but are disposed alternately with the first sensing patterns 12 so as not to overlap with the first sensing patterns 12. For example, the second sensing patterns 14 may be formed to be closed to each other, having the same diamond pattern as the first sensing patterns 12, and may include a plurality of Y patterns, wherein second sensing patterns 14 having the same Y-coordinates in one column are coupled to each other.

The second sensing patterns 14 have pads 14a in order that they can be electrically coupled to the metal patterns 15 in the column unit. The pads 14a of the second sensing patterns 14 may be alternately provided on the left side or the right side, may be positioned on only the left side or the right side, or may be positioned on both the left and right sides, in the column unit.

The first and second sensing patterns 12 and 14 and the first insulating film 13 are made of a transparent material so that light emitted from a display panel (not shown), etc. disposed in the lower portion of the touch screen panel 10 can transmit the touch screen panel 10. The first and second sensing patterns 12 and 14 are made of a transparent electrode material such as indium tin oxide (hereinafter, referred to as ITO), and the first insulating film 13 is made of a transparent insulating material.

The thickness thereof can be set in the range that the touch screen panel 10 (in particular, the first and second sensing patterns 12 and 14) can have a relatively low surface resistance, securing the transmittance that light from the display panel is transmitted. In other words, the thickness of the first and second sensing patterns 12 and 14 and the first insulating film 13 can be set to be optimized in consideration of the transmittance and the surface resistance.

For example, the first and second sensing patterns 12 and 14 may be formed in an indium tin oxide (hereinafter, ("ITO") pattern having a thickness of from about 100 Å to about 300 Å, respectively, and the first insulating film 13 may comprise a transparent insulating material having a thickness of from about 400 Å to about 1000 Å (for example, a thickness of from about 400 Å to about 700 Å) in which optical refractive index in the range of from about 1.6 to about 1.9 is secured. However, this is merely one embodiment but the present embodiments are not limited thereto. Therefore, the thickness thereof may also be changed in consideration of the transmittance and/or the surface resistance, etc.

The metal patterns 15 are disposed on edge regions of regions where the first and second sensing patterns 12 and 14 are formed, in particular, on regions corresponding to the pads 12a and 14a of the first and second sensing patterns 12 and 14. The metal patterns 15 as described above electrically couples the sensing patterns 12 and 14 in one row unit or in one column unit to position detecting lines (not shown), respectively, to allow contact position detecting signals to be supplied to a driving circuit (not shown), etc.

The second insulating film 16 is formed on the second sensing patterns 14 to cover them. For example, the second insulating film 16 may be formed on the second sensing patterns 14, made of a transparent insulating material having a thickness of from about 400 Å to about 1000 Å. The second insulating film 16 as described above may be omitted according to the design of a product.

If the touch screen panel 10 is touched using a human's finger or an object in a state where the respective constituents of the touch screen panel 10 as described above are combined as shown in FIG. 3, a change in electrostatic capacity in accordance with the contact position is transferred to the driving circuit side, via the first and second sensing patterns 12 and 14, the metal patterns 15 and the position detecting lines. The change in electrostatic capacity is converted into an electrical signal by the X and Y input processing circuits (not shown), etc. so that the contact position is comprehended.

With the touch screen panel 10 of the present embodiments as described above, the first sensing patterns 12 coupled to each other along the first direction and the second sensing patterns 14 coupled to each other along the second direction are disposed on different layers, making it possible to reduce the number of masks and to simplify the process.

While the present embodiments have been described in connection with certain exemplary embodiments, it is to be understood that the embodiments are not limited to the disclosed embodiments, but, on the contrary, is intended to cover various modifications and equivalent arrangements included within the spirit and scope of the appended claims, and equivalents thereof.

What is claimed is:

1. A touch screen panel device, comprising:
a touch screen panel; and
an adhesive member that is formed on at least any one of an upper surface and a lower surface of the touch screen panel and comprises an adhesive layer and re-releasing coating layers formed on both surfaces of the adhesive layer,
wherein the re-releasing coating layer comprises fluorine (F) or silicon (Si) in UV curing resin.

2. The touch screen panel device as claimed in claim 1, further comprising:
a window that is attached to the upper surface of the touch screen panel by the adhesive member formed on the upper surface of the touch screen panel.

3. The touch screen panel device as claimed in claim 1, further comprising:
a flat panel display device that is attached to the lower surface of the touch screen panel by the adhesive member formed on the lower surface of the touch screen panel.

4. The touch screen panel device as claimed in claim 1, wherein the adhesive layer is implemented using a transparent adhesive material having a high light transmittance and comprises a super view resin (SVR) or optical cleared adhesive (OCA) film.

5. The touch screen panel device as claimed in claim 1, wherein the fluorine or silicon additives included in the re-releasing coating layer are phase-separated through a pre-cure process to be positioned on the surface.

6. The touch screen panel device as claimed in claim 1, wherein the touch screen panel comprises:
a transparent substrate;
a plurality of first sensing patterns (X patterns) formed on the transparent substrate and formed to be coupled to each other along a first direction;
a first insulating film formed on the first sensing patterns; and
a plurality of second sensing patterns (Y patterns) formed on the first insulating film and formed to be coupled to each other along a second direction and disposed alternately with the first sensing patterns not to overlap with the first sensing patterns.

7. The touch screen panel device as claimed in claim 6, wherein the first insulating film comprises a transparent insulating material with a thickness from about 400 Å to about 1000.

8. The touch screen panel device as claimed in claim 7 wherein thickness of the transparent insulating material is from about 400 Å to about 700 Å.

9. The touch screen panel device as claimed in claim 7, wherein the optical refractive index of the transparent insulating material is from about 1.6 to about 1.9.

10. The touch screen panel device as claimed in claim 6, wherein the sensing pattern comprises ITO.

11. A method of making a touch screen panel device, comprising:
providing a touch screen panel; and
providing an adhesive member that is formed on at least any one of an upper surface and a lower surface of the touch screen panel;
providing an adhesive layer; and
preparing a re-releasing coating layer formed by adding fluorine (F) or silicon (Si) in UV curing resin;
forming the re-releasing layer on both surfaces of the adhesive layer; and assembling the touch screen panel device.

12. The method of claim 11, further comprising:
providing a window that is attached to the upper surface of the touch screen panel by the adhesive member formed on the upper surface of the touch screen panel.

13. The method of claim 11, further comprising:
attaching a flat panel display device to the lower surface of the touch screen panel by the adhesive member formed on the lower surface of the touch screen panel.

14. The method of claim 11, wherein the adhesive layer is implemented using a transparent adhesive material having a high light transmittance and comprises a super view resin (SVR) or optical cleared adhesive (OCA) film.

15. The method of claim 11, wherein the fluorine or silicon additives included in the re-releasing coating layer are phase-separated through a pre-cure process to be positioned on the surface.

16. The method of claim 11, wherein the touch screen panel comprises:
- a transparent substrate;
- a plurality of first sensing patterns (X patterns) formed on the transparent substrate and formed to be coupled to each other along a first direction;
- a first insulating film formed on the first sensing patterns; and
- a plurality of second sensing patterns (Y patterns) formed on the first insulating film and formed to be coupled to each other along a second direction and disposed alternately with the first sensing patterns not to overlap with the first sensing patterns.

17. The method as claimed in claim 16, wherein the first insulating film comprises a transparent insulating material with a thickness from about 400 Å to about 1000 Å.

18. The method as claimed in claim 17 wherein thickness of the transparent insulating material is from about 400 Å to about 700 Å.

19. The method as claimed in claim 17, wherein the optical refractive index of the transparent insulating material is from about 1.6 to about 1.9.

20. The method as claimed in claim 16, wherein the sensing pattern comprises ITO.

* * * * *

(12) SUPPLEMENTAL EXAMINATION CERTIFICATE

United States Patent
Lee et al.

(10) Number: US 8,269,741 F1
(45) Certificate Issued: Jun. 24, 2015

Control No.: 96/000,109
Primary Examiner: Ling Xu

Filing Date: Sep. 18, 2012

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2008-280439-A | 11/2008 |
| JP | 2008-119892-A | 5/2008 |

(12) SUPPLEMENTAL EXAMINATION CERTIFICATE

United States Patent  
Lee et al.

(10) Number: US 8,269,741 F1  
(45) Certificate Issued: Jul. 1, 2015

Control No.: 96/000,109  
Primary Examiner: Ling Xu

Filing Date: May 27, 2015

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2008-280439-A | 11/2008 |
| JP | 2008-119892-A | 5/2008 |

\*This is a Corrected Supplemental Examination Certificate. The Supplemental Examination Certificate issued June 24, 2015 had an incorrect filing date.